US007708006B2

(12) United States Patent
Sun

(10) Patent No.: US 7,708,006 B2
(45) Date of Patent: May 4, 2010

(54) REMOVABLE FLAME HEAT REGULATING APPARATUS INCLUDING AN INNER HOLLOW SHELL AND AN OUTER WALL FOR A BURNER OF A GAS STOVE

(76) Inventor: Yizhong Sun, 30152 Galbreth Ct., Castaic, CA (US) 91384

( * ) Notice: Subject to any disclaimer, the term of this patent is extended or adjusted under 35 U.S.C. 154(b) by 184 days.

(21) Appl. No.: 11/811,521

(22) Filed: Jun. 11, 2007

(65) Prior Publication Data

US 2008/0302353 A1 Dec. 11, 2008

(51) Int. Cl.
*F24C 1/16* (2006.01)
*F24C 3/14* (2006.01)
(52) U.S. Cl. .............. 126/39 K; 126/40; 126/211; 126/214 D; 126/215; 126/216; 126/50; 126/22
(58) Field of Classification Search ............. 126/43–49, 126/1 R, 9, 9 B, 9 R, 24, 39 B, 39 E, 39 K, 126/39 M, 39 R, 40, 152 B, 153, 154, 211, 126/214 D, 215, 216, 400; 219/385, 386, 219/390, 443.1, 451.1, 452.11, 455.12, 456.1, 219/481, 521, 534, 535; 7/109; F24C 1/16, F24C 3/08, 15/10
See application file for complete search history.

(56) References Cited

U.S. PATENT DOCUMENTS

| 936,482 | A | * | 10/1909 | Seeley ........................ 126/43 |
| 1,072,115 | A | * | 9/1913 | Harmon ..................... 126/39 R |
| 1,091,649 | A | * | 3/1914 | Grady et al. .................. 126/36 |
| 1,156,087 | A |   | 10/1915 | Kupter |
| 2,166,442 | A |   | 7/1939 | Kahn |
| 2,327,807 | A | * | 8/1943 | Lotter ....................... 126/39 H |
| 3,187,742 | A | * | 6/1965 | Powers .................... 126/214 C |
| 3,658,049 | A | * | 4/1972 | Gerber ....................... 126/215 |
| 4,337,752 | A | * | 7/1982 | Leounes ..................... 126/215 |
| 4,448,186 | A | * | 5/1984 | Smith ......................... 126/215 |
| 4,620,526 | A | * | 11/1986 | Tetschner .................... 126/56 |
| 4,705,021 | A | * | 11/1987 | Beach ....................... 126/41 R |
| 4,794,906 | A | * | 1/1989 | Longley, Jr. ................ 126/9 R |
| 4,909,235 | A | * | 3/1990 | Boetcker .................... 126/9 R |
| 5,002,039 | A | * | 3/1991 | Esposito ................. 126/214 C |
| 5,323,759 | A |   | 6/1994 | Hammel et al. |
| 6,078,029 | A | * | 6/2000 | Trujillo et al. .............. 219/415 |
| 6,244,263 | B1 | * | 6/2001 | Schlosser et al. .......... 126/39 R |
| 6,505,621 | B2 |   | 1/2003 | Gabelmann |
| 6,851,419 | B2 | * | 2/2005 | Reiner ......................... 126/9 B |
| 7,246,614 | B2 | * | 7/2007 | Huggins ....................... 126/44 |

(Continued)

*Primary Examiner*—Steven B McAllister
*Assistant Examiner*—Daniel E Namay

(57) ABSTRACT

A flame heat regulating apparatus for a cooktop of a gas stove, having an inner hollow shell and an outer wall which are both placed onto the stove cooktop. The shell further positioned to surround a gas burner is arcuate in shape, having a smaller sized bottom side and a larger sized top side. A plurality of air passages are through the shell, wherein the air passages are more densely distributed onto a lower part of the shell, as compared with the air passages which are less densely distributed onto an upper part of the shell. The outer wall further positioned to surround the shell has a plurality of air passages which are evenly distributed therethrough. In addition, a plurality of extensions projecting upwardly are spaced on a top side of the wall to support a cookware. The apparatus increases heating efficiency of the flame, and prevents undesirable heating of a handle of the cookware in cooking.

27 Claims, 7 Drawing Sheets

U.S. PATENT DOCUMENTS

2004/0045542 A1 3/2004 Zhou et al.
2005/0109330 A1 5/2005 Pestrue et al.
2005/0115556 A1* 6/2005 Carson et al. ............. 126/25 R

* cited by examiner

REMOVABLE FLAME HEAT REGULATING APPARATUS INCLUDING AN INNER HOLLOW SHELL AND AN OUTER WALL FOR A BURNER OF A GAS STOVE

BACKGROUND OF THE INVENTION

1. Field of the Invention

The present invention is related to an accessory of a gas stove which functions as a removable flame heat regulating apparatus for increase of heating efficiency of the flame in cooking.

2. Description of the Prior Art

Gas stoves including the cooktops are known. The following 9 United States patents and published patent applications are the closest prior art references which are related to the present invention.

U.S. Pat. No. 1,156,087 issued to Kupfer on Oct. 12, 1915 for "Flame Shield For Gas Stove" discloses a cylindrical metal tube which is used as a flame shield for a burner of the gas stove. The tube is comprised of a circular wall having an upper end and a lower end, wherein a plurality of vertical slots, preferably three, are circumferentially spaced on the wall. The slots are extending upward from the lower end of the wall to an upper position of the wall, wherein one of them is arranged to fit over the gas pipe. The flame shield is placed between the stove grids on the cooktop and a platform placed under the cooktop, wherein the upper end of the shield reaches into the plane of the undersurface of the grids, the lower end of the shield rests upon the platform, and the body of the shield surrounds the burner.

U.S. Pat. No. 2,166,442 issued to Kahn on Jul. 18, 1939 for "Cooking Stove" discloses a mechanical structure which is connected to the top of a gas burner having a plurality of gas ports and the cooktop of a stove, wherein an annular curved shield surrounds the burner adjacent the gas ports and extends upwardly and outwardly to the inside edge of the recessed shoulder of the cooktop for directing the heat from the burner toward the grate opening.

U.S. Pat. No. 3,187,742 issued to Power on Jun. 8, 1965 for "Combination Gas Burner Grid And Flame Shield" discloses an improved gas burner grid comprising a substantially rigid and arcuate shield to eliminate any undesirable overheating of a pan handle. The shield is placed to the radial innermost ends of the two adjacent ribs, which are among a total of 8 ribs, wherein all the ribs are circumferentially spaced onto a rigid, cast-iron ring of the circular grid. The grid is further adapted to be seated removably in the upper open end of a stationary, generally cup shaped housing having a bottom through the center of which projects a conventional gas stove burner.

U.S. Pat. No. 6,851,419 issued to Reiner on Feb. 8, 2005 for "Portable Hiking Stove" discloses an improved portable hiking stove. The stove is comprised of a base member having a plurality of air passages therethrough with an opening dimensioned to receive a burner therein, three identical side members vertically dimensioned so as to be assembled together to support the horizontal base member therebetween, and a circularly cylindrical wall acted as a wind screen having a lower bottom end from which is supported by three protrusions of the respective three side members. Each identical side member is further comprised of a plurality of air passages placed on its lower part, wherein the positions of the air passages therethrough each side member are lower than the position where the base member is supported therebetween the side members. The wind screen is further placed, wherein it upper end is positioned to be higher than the upper ends of the side members, and its lower end is positioned to be higher that the horizontal base member which is placed.

United States Patent Publication No. 2005/0115556 issued to Carson et al. on Jun. 2, 2005 for "Turkey Fryer/Outdoor Cooker Wind and Fire Guard" discloses a wind screen device for outdoor grill. The device can be assembled from a horizontal bottom plate and a series of vertical side plates to be a cuboid enclosure or wind screen. The enclosure is capable of hosting a variety of types any sizes of outdoor cooking units. The windscreen device includes at least one pair of air vent openings therethrough adjacent to a bottom edge of each side plate, and an additional opening in one of its side plates, which is designed to admit a gas hose therethrough.

United States Patent Publication No. 2004/0045542 issued to Zhou et al. on Mar. 11, 2004 is for an "Outdoor Cook Stove". The Publication discloses a portable outdoor stove including a burner and a wind guard having an opened bottom end of cylinder shape capable of tightly coupled with a cooking vessel and possessing window opening of less than 180 degree toward its top for exhaust outlet, wherein the burner is placed at the center of the opened bottom of the wind guard.

United States Patent Publication No. 2005/0109330 issued to Pestrue et al. on May 26, 2005 for "Cooking Stove Including Invertible Support Rack, Support Rack With Dual Cooking Surfaces And Method Of Using Same" discloses a stove for outdoor use. The stove includes a hollow shell, supporting structure, and a burner assembly, operatively attached to the side of the shell, and a vessel support rack for placement on the shell.

Gas stoves are popularly used apparatus in human society. The usage of the gas stoves consumes tremendous amount of combustive gases, and also generates significant amount of carbon dioxide gases which are of total green house gases generated by human society. The modern gas stoves for the household usage can be classified to a sealed burner mounting and an opened burner mounting (see commercial stoves elsewhere), regarding the mechanical structure to affix gas burners onto the cooktops of the stoves. The former one is also illustrated from U.S. Pat. No. 5,323,759 issued to Hammel et al. on Jun. 28, 1994 for "Sealed Burner Mounting Assembly" (the Hammel Patent) and U.S. Pat. No. 6,505,621 issued to Gabelmann on Jan. 14, 2003 for "Sealed Gas Burner Assembly" (the Gabelmann Patent) (see FIGS. 1 and 2, and illustration in the section of Description of this Application).

However, from the illustration of the above mentioned Hammel and Gabelmann Patents, it has been discovered that there is absence of a flame heat regulating apparatus for a burner of the gas stove cooktop. The flame heat regulating apparatus can be removably placed onto the stove cooktop to surround a gas burner and support a cookware. Therefore, heat radiation and convection from flame of the gas burner can be well regulated, which are maximumly directed to heat a cookware, so that the cookware can be effectively and efficiently heated. With the aid of the present invention removable flame heat regulating apparatus, increase of the heating efficiency in cooking can be maximumly achieved. Therefore it will further bring advantages of reduction of the combustive gas consumption which is good for the cost reduction, and reduction of the green house gas production which is beneficial to the environmental protection.

There is a significant need to provide a removable flame heat regulating apparatus for a burner of a gas stove to significantly increase heating efficiency, which brings additional advantages of reduction of the combustive gas consumption and reduction of the green house gas production in cooking.

SUMMARY OF THE INVENTION

The present invention is a removable flame heat regulating apparatus for a burner of a gas stove, comprising an inner hollow shell and outer square wall. The inner hollow shell is circularly concave in shape, having a smaller sized bottom circumference and a larger sized top circumference. A plurality of air passages of openings are therethrough the inner hollow shell, wherein the air passages are more densely distributed onto a lower part of the inner hollow shell, as compared with the air passages which are less densely distributed onto an upper part of the inner hollow shell.

The outer square wall is comprised of four identical upward plates, which are connected to one another to form the wall. A plurality of air passages are evenly distributed therethrough each plate of the outer wall. In addition, an extension projecting upwardly is positioned at a middle of a top side of each upward plate. A plurality of attachment means are placed on an inner side of each upward plate, which are used to affix optional cookware supports, so that a small sized cookware can be placed on the top of the optional cookware supports for cooking.

Both the inner circularly concave hollow shell and outer square wall are positioned onto the cooktop of the gas stove, wherein the inner hollow shell is further positioned to surround a gas burner. The outer square wall is positioned to surround the inner hollow shell and additionally support a cookware, wherein the cookware is placed on top sides of the extensions of the outer square wall. The extension further functions as a flame shield for preventing undesirable flame heating of a handle of the cookware in cooking.

Application of the flame heat regulating apparatus enables to increase heating efficiency of the flame in cooking. The inner circularly concave hollow shell contributes to the increased heating efficiency through regulating the heat radiation and heat convection of the flame.

In regulating the flame heat radiation, the inner hollow shell reflects radiated heat of the flame which is initially radiated outwardly and downwardly away from the cookware back to heat the cookware. In regulating the flame heat convection including air convection, the inner shell directs the heat flow and the air flow to flow to the cookware. Air with a lower temperature from surrounding areas of the flame is regulated to flow to the flame for involving in combustion, wherein the air mainly flows through the air passages more densely distributed through the lower part of the inner hollow shell. Air with a higher temperature and exhaust gases with a higher temperature of the flame are regulated to flow upwardly to heat the cookware, wherein the air and exhaust gases are both surrounded by the inner shell.

The outer square wall contributes to the increased heating efficiency through first blocking radiated heat which is radiated outwardly from the outside outer side of the inner hollow shell. The outer square wall second provides the air passages which regulate air with the lower temperature from surrounding areas of the flame to flow towards the inner hollow shell. The outer square wall third provides a gap which is constructed by the extensions for the flame exhaust gases and the air with the higher temperature to flow outwardly and upwardly to heat the cookware. In addition, the outer wall functions as a heat shield for preventing undesired heating of a handle of the cookware.

It is therefore an object of the present invention to provide a flame heat regulating apparatus for a cooktop of a gas stove, wherein the apparatus is comprised of an inner hollow shell and outer square wall, so that the flame heat regulating apparatus is used to increase heating efficiency of the flame in cooking, which brings additional advantages of reduction of the combustive gas consumption and reduction of the green house gas production.

It is also an object of the present invention to provide the inner hollow shell which is circularly concave in shape, and extends upwardly and outwardly from a bottom circumference having a smaller size to a top circumference having a larger size, so that the inner circularly concave hollow shell contributes to the increased heating efficiency through regulating the flame heat radiation, which reflects radiated heat of the flame that is initially radiated outwardly and downwardly away from the cookware back to heat the cookware.

It is an additional object of the present invention to provide the inner hollow shell, which is comprised of a plurality of air passages through the inner hollow shell. The air passages are more densely distributed onto a lower part of the inner hollow shell, as compared with the air passages which are less densely distributed onto an upper part of the inner hollow shell, so that the inner hollow shell contributes to the increased heating efficiency from regulating the heat convection including air convection. Air with a lower temperature from surrounding areas of the flame flows to the flame, wherein the air is regulated to mainly flow through the air passages of the lower part of the inner hollow shell to involve in the flame combustion. In addition, air with a higher temperature and exhaust gases with a higher temperature of the flame are regulated to flow upwardly to heat the cookware, wherein the air and exhaust gases are both surrounded by the inner shell.

It is a further object of the present invention to provide the outer square wall having four identical upward plates which are connected to one another, wherein a plurality of air passages are evenly distributed therethrough, and an extension projecting upwardly is positioned at a middle of the top transverse side of each upward plate, so that the outer square wall contributes to the increased heating efficiency from blocking outward heat radiation which is radiated outwardly from the outside outer side of the inner hollow shell, providing air passages which regulate air with the lower temperature from surrounding areas of the flame to flow towards the inner hollow shell, and providing a gap which is constructed by the extensions for the flame exhaust gases and the air with the higher temperature to flow outwardly and upwardly to heat the cookware.

It is an additional object of the present invention to provide the outer square wall having four identical upward plates which are connected to one another, wherein each plate has an extension projecting upwardly which is positioned at a middle of the top side of each plate, so that each extension of the outer square wall supports a cookware which is positioned at the top of each extension and also functions as a flame shield for preventing undesirable heating of a handle of the cookware.

It is a further additional object of the present invention to provide appropriate surface chemical and electrochemical treatments including the ceramic coatings which are applied to the inner and outer surface of the respective inner hollow shell and outer square wall, so that the surface treatment enhances regulation of the heat convection and heat radiation, and increases durability of the inner shell and outer wall.

It is another object of the present invention to provide a plurality of attachment means which are positioned on each upward plate of the outer square wall, and are used to affix optional cookware supports, so that a small sized cookware can be positioned on the top of the optional cookware supports for cooking.

It is also an object of the present invention to provide the flame heat regulating apparatus which is removably placed on the cooktop of the gas stove, so that the apparatus is easily to be maintained, including being easily cleaned.

It is a further object of the present invention to provide a flame heat regulating apparatus containing an integrated inner hollow shell and outer wall, so that the apparatus brings additional versatility in use.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
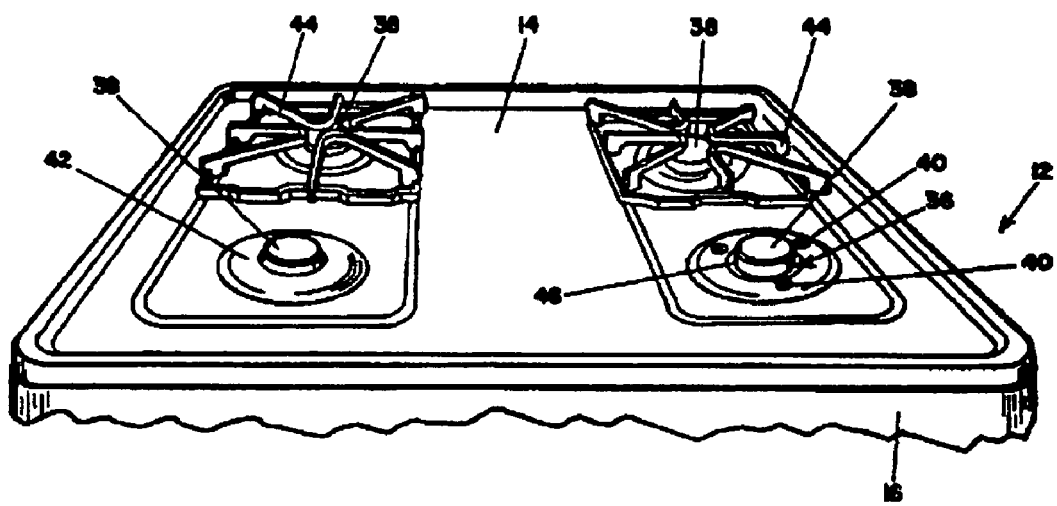
FIG. 1 is a front perspective view of a prior art cooktop including individual grates from a gas stove having a sealed burner mounting assembly, where the figure illustrates absence of a flame heat regulating apparatus that could be placed on the cooktop to surround a burner and support a cookware.
Figure 2:
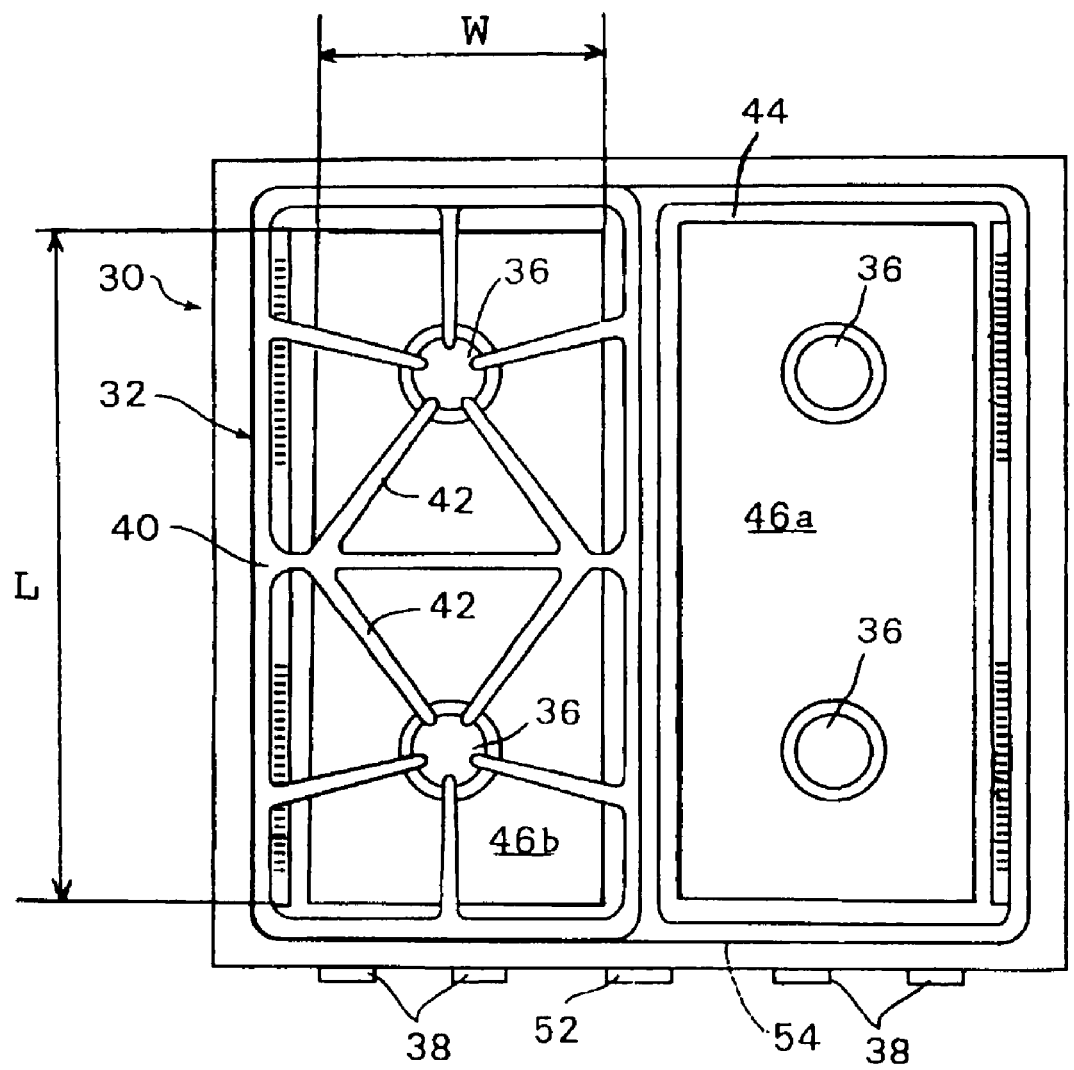
FIG. 2 is a top plan view of another prior art cooktop including an extended grate from a gas stove having a sealed gas burner assembly, where the figure illustrates absence of a flame heat regulating apparatus that could be placed on the cooktop to surround a burner and support a cookware.

Reference to FIGS. 1 and 2 illustrates well known cooktops of the modern gas stoves as the prior art. Referring to FIG. 1, there is illustrated main cooktop 14 of a sealed gas burner stove having a sealed burner mounting assembly and two individual grates 44 which are positioned to cove the respective two of four burners 38 on the cooktop 14. FIG. 1 is a copy of FIG. 1 of U.S. Pat. No. 5,323,759 to Hammel et al. for "Sealed Burner Mounting Assembly", from which FIG. 1 copies all of the reference numbers presented in FIG. 1.

Referring to FIG. 2, there is illustrated a top plan view of a cooktop having an extended grate. FIG. 2 is a copy of FIG. 2 of U.S. Pat. No. 6,505,621 to Gabelmann for "Sealed Gas Burner Assembly". FIG. 2 also copies all the reference numbers in FIG. 2 of the Gabelmann Patent. Reference to FIG. 2 illustrates that an extended removable grate 40 is provided on the cooktop 32 to extend from the front to the back with a plurality of fingers 42 for supporting cook pans or the like utensils above a front gas burner 36 and a back gas burner 36.

From illustration in FIGS. 1 and 2 of the prior art cooktops of the gas stoves, it has been discovered that there is absence of a flame heat regulating apparatus. The apparatus can be removably positioned onto the stove cooktop to surround a gas burner for increasing heating efficiency of the flame, supporting a cookware, and preventing undesirable heating of a handle of the cookware in cooking. It will be appreciated that heat transfer from the flame of the burner to the cookware is dependent upon factors of heat radiation and heat convection. Therefore with the aid of the flame heat regulating apparatus of the present invention, the heat radiation and convection of the flame can be well regulated so that the cookware can be effectively and efficiently heated. Therefore, the present invention can reach the object to maximumly increase heating efficiency of the flame in cooking.

Figure 3:
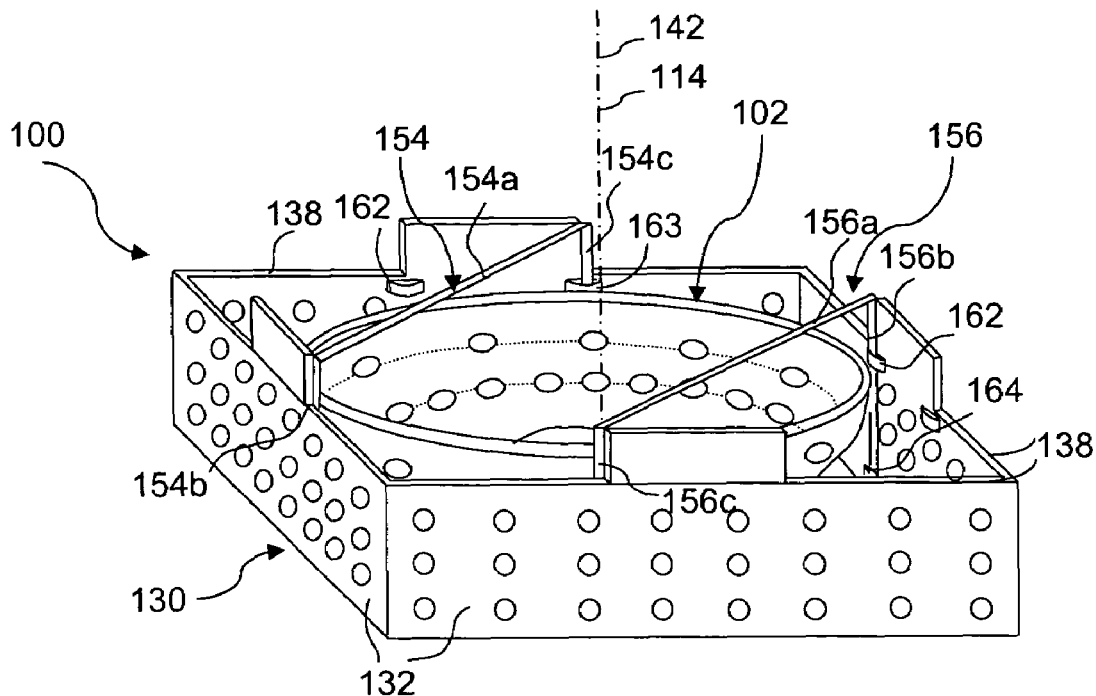
FIG. 3 is a perspective view of a removable flame heat regulating apparatus having an inner circularly arcuate shell, an outer square wall and optional cookware supports according to a first embodiment of the present invention.
Figure 4:
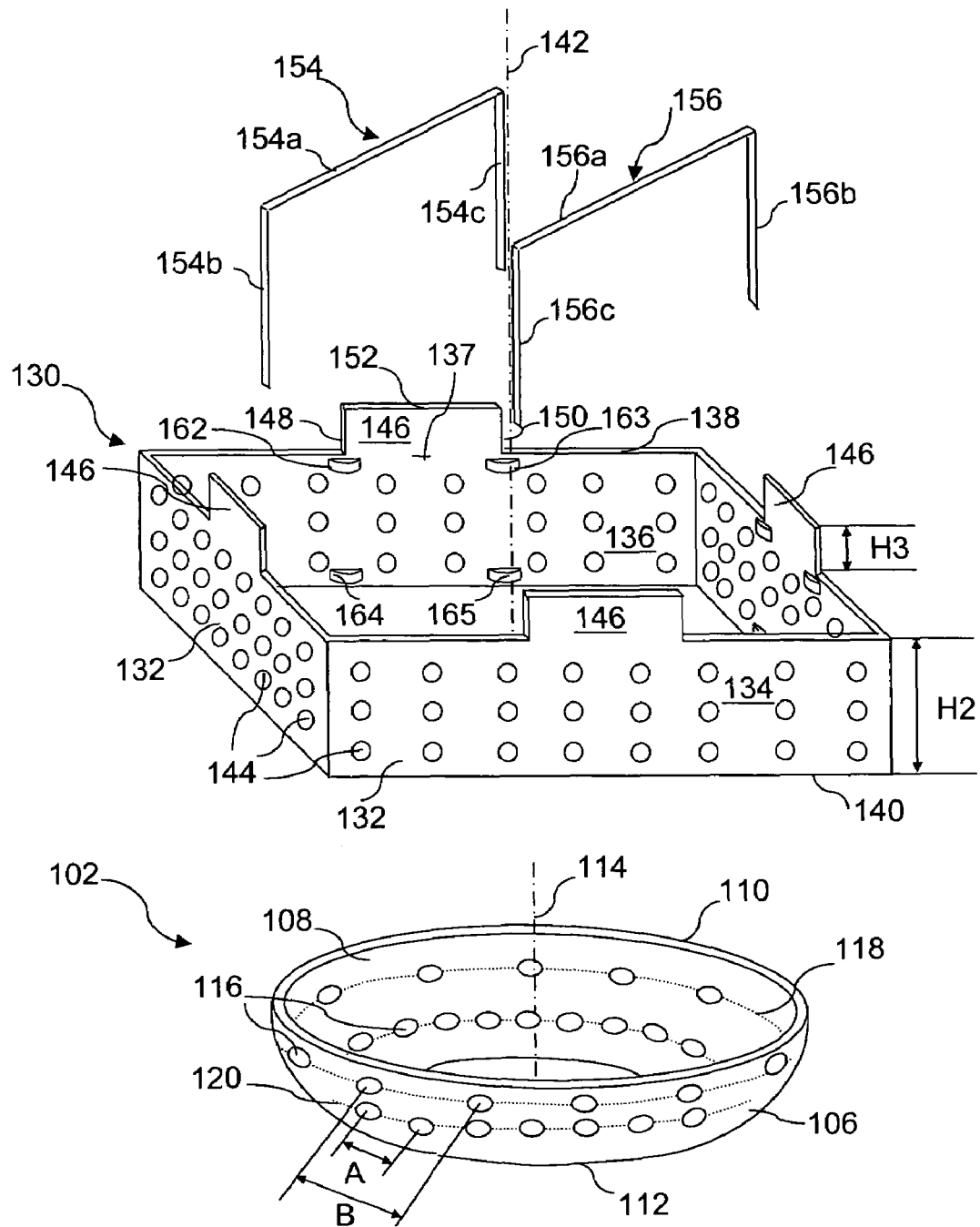
FIG. 4 is a perspective exploded view to illustrate the inner circularly arcuate shell, outer square wall and optional cookware supports according to the first embodiment of the present invention removable flame heat regulating apparatus.
Figure 5:
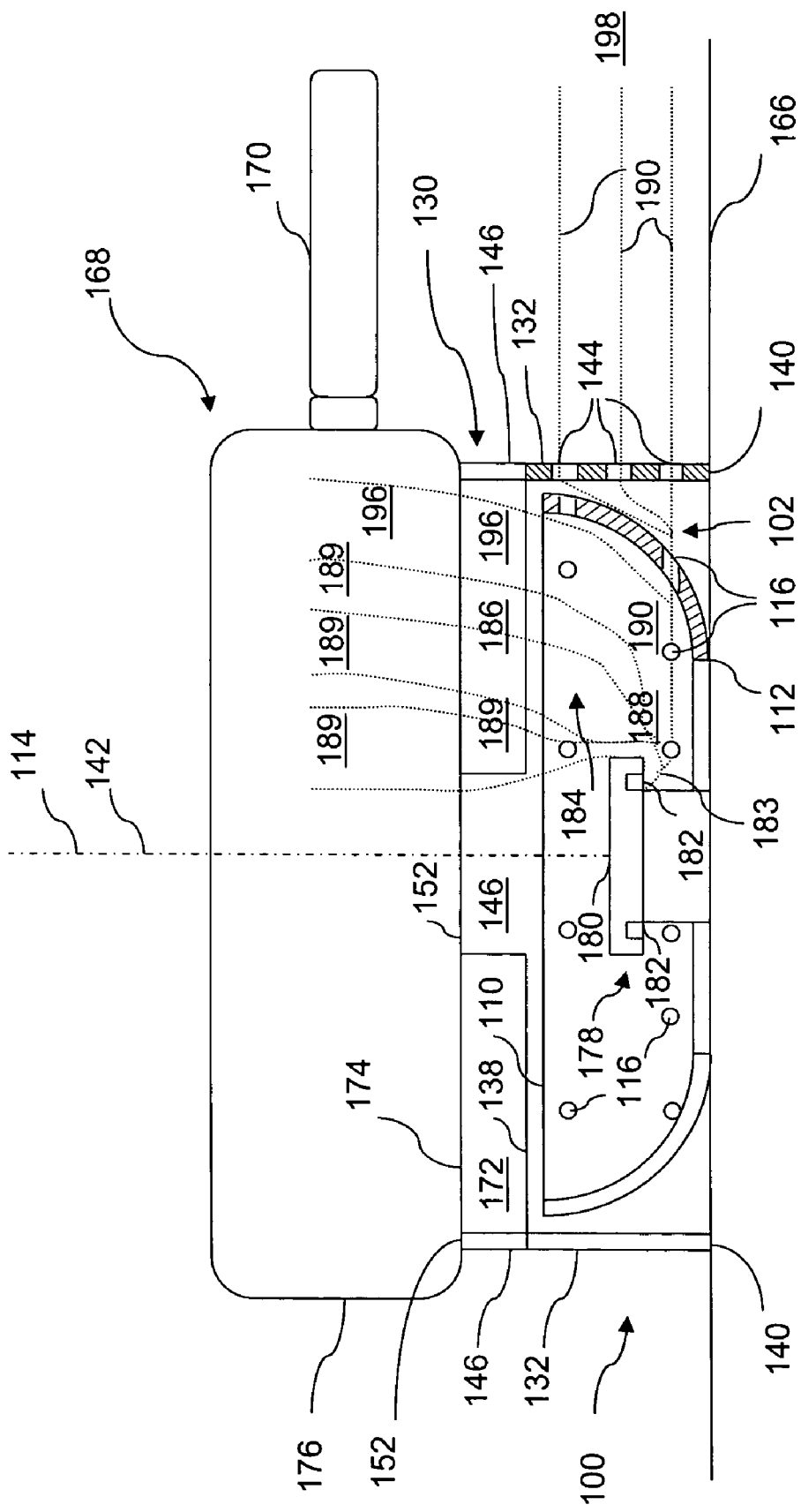
FIG. 5 is a schematic view of a burner region of a stove cooktop including a cross-section view of the right half of the first embodiment to illustrate application of the first embodiment of the present invention wherein the inner circularly arcuate shell is positioned on the cooktop of the stove to surround the gas burner, and the outer square wall is positioned on the cooktop to surround the inner circular shell and further support a cookware. For a better presentation, FIG. 5 only shows a right side of the flame, the air flow and exhaust gas flow, which are represented by evenly spaced dotted lines.

Referring to FIGS. 3, 4 and 5, there is illustrated removable flame heat regulating apparatus 100 from a first embodiment of the present invention. The apparatus 100 is comprised of an inner circularly arcuate hollow shell 102 and an outer square wall 130, which are both placed onto a stove cooktop 166. The inner hollow shell 102 is further positioned to surround a gas burner 178. The outer square wall 130 is further positioned to surround the inner shell 102 and support a cookware 168 having a bottom side 174, wherein the cookware 168 is placed above the burner.

As illustrated in FIG. 4, the inner hollow shell 102 is comprised of an outer surface 106, an inner surface 108, a top circumference 110 and a bottom circumference 112. The inner circularly arcuate hollow shell 102 from its bottom circumference 112 extends upwardly and outwardly to end the top circumference 110. Therefore, the top circumference 110 is larger than the bottom circumference 112, wherein both circumferences are aligned with a rotational axis 114 of the inner hollow shell 102. As additionally illustrated, the inner circularly arcuate hollow shell 102 is configured to be concave when viewed the shell along a direction from the rotational axis 114 to the shell inner surface 108. In a preferred embodiment the inner hollow shell 102 is parabolic in shape.

It will be appreciated that, the concave including the parabolic shape of the inner circularly arcuate hollow shell 102 is designed from the spirit and scope of the present invention for regulating the flame heat radiation, and the flame heat convection including the air convection.

The concave including the parabolic shaped circular shell 102 enables to reflect outward and downward heat radiation, which is initially radiated by the flame away from the cookware, back to heat the cookware bottom side 174. In above illustration, the outward and downward directions of the heat radiation from the flame are defined relative to the horizontal orientation of the bottom side 174 of the cookware 168 which is placed above the burner. It will be appreciated that heat radiation from the flame is towards every angular directions in the three-dimensional space. Therefore, the flame which is positioned under the bottom of the cookware has a part of the heat radiation, which is outward and downward away from the cookware. This means that the part of the heat radiation is not used to heat the cookware. In the presence of the present invention inner circularly concave shell 102, the heat radiated outwardly and downwardly from the flame can be regulated reflecting back to heat the cookware 168. This is one of reasons to increase the heating efficiency in cooking from the present invention, as compared with a low heating efficiency of the prior art cooktops of the gas stoves without having the inner hollow shells.

The inner hollow shell 102 is further illustrated in FIG. 4 to comprise a plurality of air passages 116 of openings therethrough, wherein the air passages 116 are divided into a first and second group. The air passages 116 in the first group are circumferentially spaced aligning with an upper circumference 118 of the shell 102 which is adjacent the top circumference 110. The air passages 116 in the second group are also circumferentially spaced aligning with a lower circumference 120 of the shell 102 adjacent the bottom circumference 112. However, the air passages 116 are not evenly distributed between two groups of air passages throughout the entire shell 102.

Such uneven distribution of the air passages is illustrated in FIG. 4 from a distance "A" between two adjacent air passages 116 aligning with the lower circumference 120 and a distance "B" between two adjacent air passages 116 aligning with the upper circumference 118, wherein the distance "A" is shorter than the distance "B". Therefore, the air passages 116 are more densely distributed to a lower part of the shell 102 adjacent the bottom circumference 112, as compared with the air passages 116 which are less densely distributed to an upper part of the wall 102 adjacent the top circumference 108.

It will be appreciated that such characteristics of the uneven air passage distribution of the present invention is particularly designed to regulate the heat convection of the flame in cooking, wherein the heat convection is based on the air convection which is taken place in space including surrounding areas of the flame and areas of the flame.

The air with a lower temperature has a heavier density, which occupies a lower part of the space adjacent the flame. In contrast, the air with a higher temperature has a lighter density, which occupies the upper part of the space including the area where the flame is located. Such density difference causes an air convection pattern of the flame. A colder air having the lower temperature, which is positioned in the surrounding areas of the flame, flows to the flame for involving in the flame combustion through a path which occupies a lower part of the space. A hotter air having the higher temperature which is positioned in the upper part of the space flows upwardly away from the flame. Therefore, the densely distributed air passages 116 on the lower part of the circularly arcuate shell 102 will provide a less flow resistance for the air with the lower temperature to flow towards the burner 178, wherein the air having oxygen is necessary for combustion of the combustive gases to form the flame.

Referring again to FIG. 4, there is illustrated outer square wall 130, comprising four identical upward plates 132 having a height "H2", an exterior side 134 and an interior side 136. The upward plates 132 are connected to one another to form the outer wall 130 having a top square transverse side 138, a bottom square transverse side 140, and a central symmetric axis 142. As further illustrated, a plurality of air passages 144 of openings are evenly distributed through each plate 132 of the wall 130. It will be appreciated that from the spirit and scope of the present invention including to regulate the air convection, a number of the air passages 144 therethrough the square wall 130 will be more than a number of the air passages 116 of the inner circular hollow shell 102.

Referring additionally to FIG. 4, each upward plate 132 at the middle position of the top transverse side 138 is comprised of an extension 146 projecting upwardly. The extension 146 is comprised of a transverse top side 152, a first and second upward side 148 and 150 having an identical height "H3". As illustrated, the height "H3" of the upward sides 148 and 150 is shorter than the height "H2" of the upward plates 132. In addition, the length of the top side 152 is generally longer that the length of the upward sides 148 and 150, so that the extension 146 can be functioned as a heat shield.

Figure 4A:
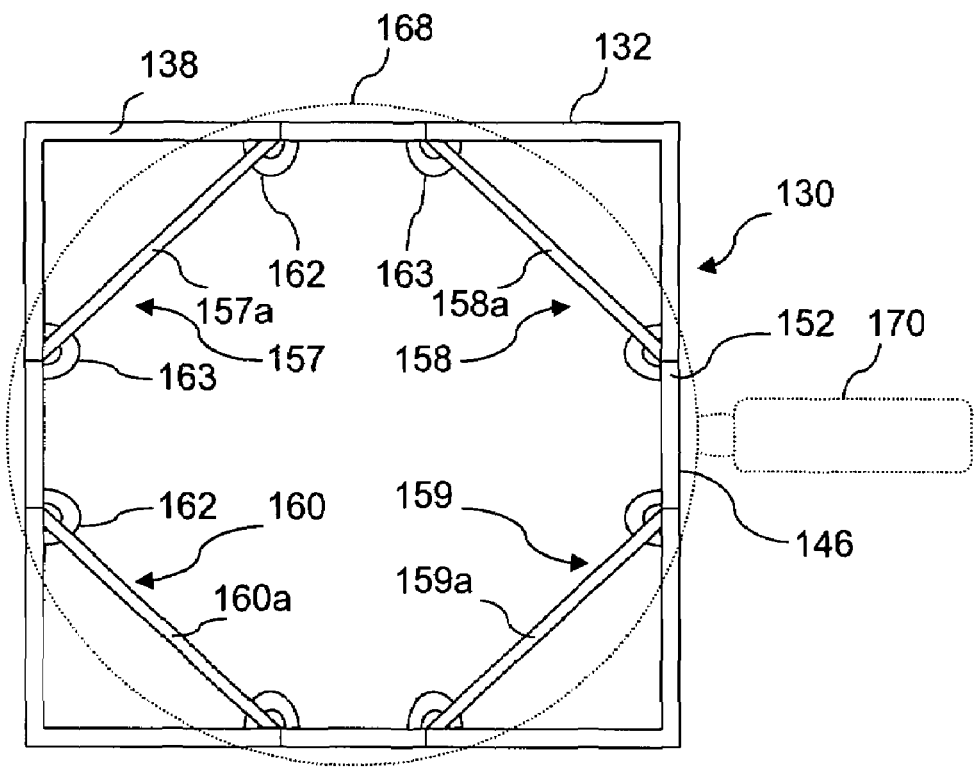
FIG. 4A is a top plan view of another preferred optional cookware supports of the outer square wall from the first embodiment of the present invention removable flame heat regulating apparatus.

It will be appreciated that the extension 146 as the heat shield can block an outward heat flow from a flame which is towards the extension 146. The outward heat flow could turn to an upward heat flow if there is absence of the extension 146, so that the upward heat flow can heat an object which is positioned above the flame, and is further vertically aligned with the upward heat flow. Therefore, as illustrated in FIGS. 4A and 5, the upward extension 146 can prevent undesirable heating of a handle 170 of the cookware 168, where the cookware is placed on the top sides 152 of the extensions 146 of the outer square wall 130, and the handle 170 is positioned to vertically align with the center of the extension top side 152. In addition, as illustrated in FIG. 5, the extensions 146 from the present invention are designed to further support the cookware 168 having the flat bottom side 174 such as the pan, or having a convex shaped bottom side such as the wok.

Referring further to FIG. 4, there is illustration that a first group of an upper hook 162 and a lower hook 164 or attachment means are positioned on the interior side 136 of each identical plate 132 of the square wall 130, wherein two hooks 162 and 164 are aligned with the first upward side 148 of the identical extension 146. In addition, the upper hook 162 is positioned adjacent the top transverse side 138 and the lower hook 164 is positioned adjacent the bottom transverse side 140 of the outer square wall 130. Similarly, a second group of an upper hook 163 and a lower hook 165 or attachment means are positioned on the interior side 136 of each identical plate 132, which are aligned with the second upward side 150 of the extension 146. As illustrated, the upper hook 163 is positioned adjacent the top side 138 and the lower hook 165 is positioned adjacent the bottom side 140 of the square wall 130.

It will be appreciated that the hooks are designed to affix a first and second identical optional cookware support 154 and 156 onto the square wall 130, so that a small sized cookware can be placed on the optional cookware supports 154 and 156. The first optional cookware support 154 is illustrated in FIG. 4 to be in a generally inverted "U" shape, comprising a top transverse section 154a, an identical first and second downward section 154b and 154c. The optional cookware supports can be made with flat metal strips or round metal rods.

Referring to FIGS. 3 and 4, when in use of the optional support 154, the first downward section 154b is inserted into the first group of the upper and lower hooks 162 and 164 of the first identical plate 132, and the second downward section 154c is inserted into the second group of the upper and lower hooks 163 and 165 of the second identical plate 132, wherein the top transverse section 154a is positioned to align with the top ends 152 of the respective extensions which are positioned. As illustrated, the second identical plate 132 is adjacent the first identical plate 132 in the clockwise direction relative to the symmetric axis 142, and the first and second identical plates 132 are connected at a 90-degree angle. In this setting, the top transverse side 154a of the first optional cookware support 154 and projections of the respective top sides 138 of the respective first and second identical plates 132 adjacent each other form an isosceles right angled triangle, wherein the top transverse side 154a is the hypotenuse side.

Similarly, the second optional cookware support 156 can be affixed. This results in that the top transverse sides side 154a of the first optional cookware support 154 and the top transverse side 156a of the second optional cookware support 156 are in parallel and have a short distance in between. As illustrated in FIG. 3, the distance is shorter, as compared with a longer distance between two oppositely positioned upward plates 132 of the square wall 130. Therefore, a small sized pan can be conveniently placed onto two transverse top sides 154a and 156a of the respective first and second optional supports 154 and 156.

Figure 4B:
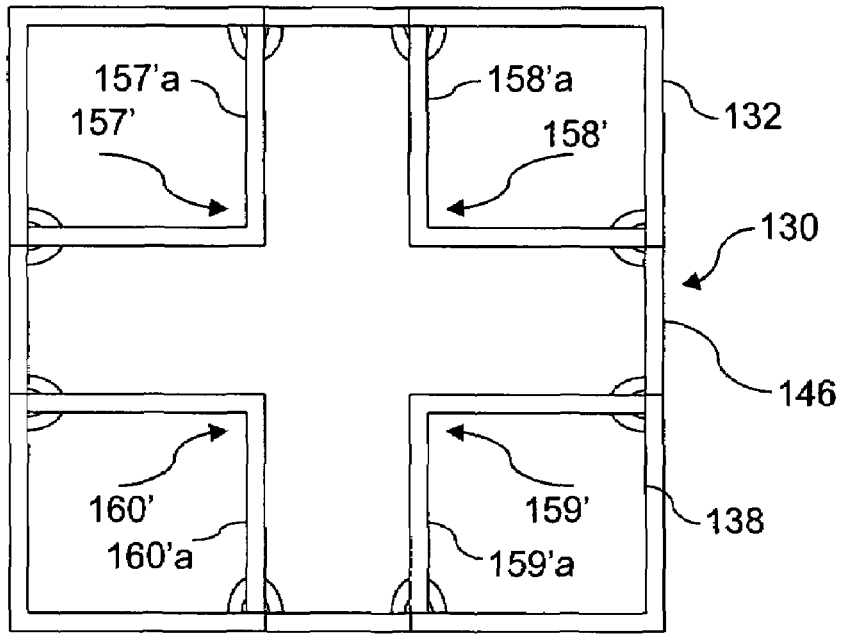
FIG. 4B is a top plan view of additional preferred optional cookware supports of the outer square wall from the first embodiment of the present invention removable flame heat regulating apparatus.

It will be appreciated that with the presence of the first group of the upper and lower hooks 162 and 164 or attachment means, and second group of the upper and lower hooks 163 and 165 or attachment means on each upward plate 132, various variations of the optional supports can be formed, which are illustrated in FIGS. 4A and 4B.

Referring to FIG. 4A, there is illustrated another preferred configuration of the optional supports of the square wall 130, comprising four identical, generally inverted "U" shaped supports 157, 158, 159 and 160. Each identical optional support 157 is comprised of a top transverse section 157a, and identical first and second downward sections (both not shown). When in use of the optional support 157, the first downward section is inserted into the second group of the upper hook 163 and lower hook (not shown) of the first identical plate 132, and the second downward section is inserted into the first group of the upper hook 162 and lower hook (not shown) of the second identical plate 132. In this setting, if viewing the top plain view of FIG. 4A, the top transverse side 157a of the first support 157 and the top sides 138 of the respective first and second identical plates 132 adjacent each other form an isosceles right angled triangle at the north-west corner of the square wall 130, wherein the top side 157a is the hypotenuse side of the isosceles right angled triangle.

Following the similar procedure, the top transverse side 158a of the second identical support 158 is the hypotenuse side of the isosceles right angled triangle at the north-east corner of the square wall 130. Similarly, the top transverse side 159a of the third identical support 159 is at the south-east corner, and the top transverse side 160a of the fourth identical support 160 is at the south-west corner of the square wall 130. Therefore the top sections 157a, 158a, 159a and 160a form a square structure to support the small sized cookware. It will be appreciated that similar to the condition illustrated in Fig. 3, the top section 157a, 158a, 159a and 160a are positioned to align with the top ends 152 of the respective extensions which are positioned.

Referring to FIG. 4B, there is illustrated additional preferred configuration of the optional supports of the square wall 130, comprising four identical, generally inverted "U" shaped supports 157', 158', 159' and 160'. The configuration of the supports illustrated in FIG. 4B is identical to the configuration in FIG. 4A, except for the top transverse section 157'a of the identical optional support 157' is a 90-degree bent structure, as compared with a straight transverse section 157a of the identical optional support 157. Therefore, the top sections 157'a, 158'a, 159'a and 160'a form a generally hollow cross shaped structure to support the smaller sized cookware.

It will be appreciated that, although the above illustration including FIGS. 4, 4A and 4B discloses various variations of the optional cookware supports including the attachment means on each upward plate 132, the optional cookware supports including the attachment means are not limited in accordance with the spirit and scope of the present invention. In fact, any optional cookware supports are appropriate if they are detachable, and are able to be affixed onto the square wall 130 by the attachment means for supporting the cookware. In addition, the attachment means are able to be placed on both interior and exterior side of the outer wall for affixing the optional cookware supports. Furthermore, at least one attachment means is appropriate for each identical upward plate 132 according to the spirit and scope of the present invention.

Reference to FIG. 5 illustrates application of the first embodiment 100 of the present invention removable flame heat regulating apparatus. The inner circularly concave hollow shell 102 is first positioned onto the cooktop 166 of the stove to surround the gas burner 178. The outer square wall 130 is second positioned onto the cooktop 166 to surround the inner shell 102, wherein the rotational axis 112 of the inner shell 102 is aligned with the symmetric axis 142 of the outer wall 130. They are further aligned with a center of the top head 180 of the burner 178 having a plurality of gas ports 182 along the circumference of the head 180. The bottom side 174 of the cookware 168 having a cylindrical outer side 176 is placed onto the top side 152 of each extension 146 of the outer wall 130. In this setting, the top circumference 110 of the inner shell 102 is positioned higher than the burner head 180 of the burner 178. The top square side 138 of the outer wall 130 is positioned at least with the same height as the top circumference 110 of the inner circularly concave shell 102.

In addition, a gap 172 between the top side 138 of the square wall 130 and the bottom side 174 of the cookware 168 is sufficiently wide, which is created by the extensions 146. The gap 172 permits that the hot exhaust gases from the flame and hot air flow freely, outwardly and upwardly along the outer side 176 of the cookware 168 to heat the cookware 168. It will be appreciated that in the presence of the wide gap 172 it will not generate a back pressure for the hot gases. The back pressure could force the flame to burn out of the gap 172, so that the flame positioned outside of the square wall 130 cannot be maximumly used to heat the cookware 168. Therefore, the outer square wall 130 having a sufficient height of the extensions 146 is significant for increase of the heating efficiency in cooking.

It will be appreciated that from a theory of the flame, the top part of the flame has the highest temperature. The bottom part of the flame has the lowest temperature, where a core of the flame is positioned. Within the core of the flame, the combustion of the combustive gases is started to take place in the presence of oxygen from the air. It will be further appreciated that according to the mechanical structure of the burner which is illustrated elsewhere, the flame bottom part is connected to a gas port of the burner head, where the pressured combustive gases flow out. It will be additionally appreciated that, from the air convection theory which is illustrated previously, the air having the lower temperature with the heavier density flows through the path which occupies the lower part of the space from the surrounding areas of the flame to the bottom of the flame for involving in the combustion.

The first embodiment 100 of the present invention removable flame heat regulating apparatus is designed to exactly follow such well known flame theory to achieve a high heating efficiency in cooking through regulating the flame heat convection, in addition to regulate the heat radiation.

Referring to FIG. 5, there is illustrated air convection pattern which is regulated by the inner circular hollow shell 102. The air 190 having the lowest temperature flows from the surrounding areas 198 of the gas burner 178 to the bottom part 188 of the flame 184 for involving in the gas combustion. The air 190 first passes through the air passages 144 of the outer square wall 130, and second mainly flows through the densely distributed air passages 116 adjacent the bottom circumference 112 of the circular shell 102.

A part of the air 190, which is involved in combustion with the combustive gases 183 from the burner gas ports 182, becomes part of the flame 184, wherein the combustion which generates exhaust gases 189 continuously takes place to the top 186 of the flame 184. As illustrated, the top 186 of the flame 184 is under the bottom side 174 of the cookware 168. A part of the air 190 which is not involved in the combustion is then heated, and continuously flows up to be an air 196 with the highest temperature, which is the same temperature as that of the top flame 186. In this situation, the hottest air 196 and the top flame 186 heat the bottom side 174 of the cookware 168. In addition, the hottest air 196 and the exhaust gases 189 from the top flame 186 flow outwardly throughout the gap 172 and continuously flow upwardly along the cylindrical outer side 176 of the cookware 168 away from the flame 184, which further heats the cookware 168 through heating the cylindrical outer side 176 of the cookware. Therefore, a high efficiency of heating in cooking can be achieved with such regulated heat convection, wherein the hottest air and exhaust gases flow mostly around the outside outer side 176 and the bottom side 174 of the cookware 168.

It will be appreciated that in above illustrated flame heat convection, the inner circularly concave hollow shell 102 contributes significantly to regulate the heat convection including the air convection. First, the densely distributed air passages on the lower part of the circularly arcuate shell 102 will provide a less flow resistance for the air with the lower temperature to the burner 178, wherein the air having oxygen is necessary for combustion of the combustive gases to form the flame. Second, the hot air and exhaust gases are surrounded by the inner circularly concave hollow shell 102, so that they are forced to flow upwardly to heat the bottom side 174 of the cookware 168. Then they continuously flow outwardly through the gap 172 to heat the cookware outer side 176.

Such heat convection regulation is extremely important for achieving the high heating efficiency in cooking for the gas stove where there is a very limited height in space between the burner head 180 and the bottom side 174 of the cookware 168. In such setting, the pressured combustive gases 183, which flow upwardly out of the gas ports 182 of the burner 178, have a high velocity and burn immediately with the oxygen in air, which generates the flame exhaust gases 189 having a high upward velocity. However, the bottom side 174 of the cookware 168 blocks the upward air pathway for the hot gases including the exhaust gases 189 and air 196. In that situation, the normal heat convection pattern of the flame, which is illustrated previously, could be disturbed so that a majority of the hot gases flow outwardly, in addition to a part of the hot gases downwardly flowing towards the cooktop 166 of the stove if there is absence of the inner circularly concave hollow shell 102. This will result in a low efficiency of heating the cookware 168, as contrasted with the high heating efficiency of the present invention.

It will be further appreciated that besides the above illustrated heat convection which is regulated by the inner shell 102, the sufficient wide gap 172, which is provided by the outer square wall 130, also contributes significantly since the sufficiently wide gap 172 provides the pathway, which promotes to achieve the regulated flame heat and air convection.

In addition to regulate the heat conviction, the first embodiment 100 of the present invention is further able to regulate the heat radiation from the flame 184, which is illustrated previously. Therefore, the regulated heat radiation also contributes a high heating efficiency in cooking.

It will be appreciated that, the heat radiation happens from an object having a higher temperature to surrounding areas having a lower temperature. Therefore, the outer surface 106 of the heated inner circularly concave hollow shell 102 also radiates the heat outwardly. However, with the presence of the outer square wall 130, which is positioned to surround the inner circular shell 102, the radiated heat from the outer surface 106 of the inner circular shell 102 is blocked by the outer square wall 130. Therefore the outer square wall 130 functions as a thermal wall to preserve the high temperature in the region around the gas burner 178, wherein the region is under the cookware 168. Therefore, the outer square wall 103 additionally contributes the high heating efficiency in cooking.

The above mechanistic illustration for the high heating efficiency in cooking can be proved by test results, which are illustrated in a section of EXAMPLES of this Application.

It will be appreciated that, as compared with the structural features of the first embodiment 100 which have been disclosed above, various variations of the structural features are readily available. For example, a rolled bead or a rim can be added to the respective top and bottom circumferences 110 and 112 of the inner shell 102 to enhance its mechanical strength. In addition, the inner shell 102 is not limited to be in round shape. In fact, any symmetrical shape is appropriate for the inner shell 102. For example, the circularly concave hollow shell can be in a shape having multiple sides, such as a square, pentagonal and hexagonal shape. For the same reason, the outer square wall 130 also can be in any symmetrical shape, as compared with the square shape disclosed above.

Figure 7:
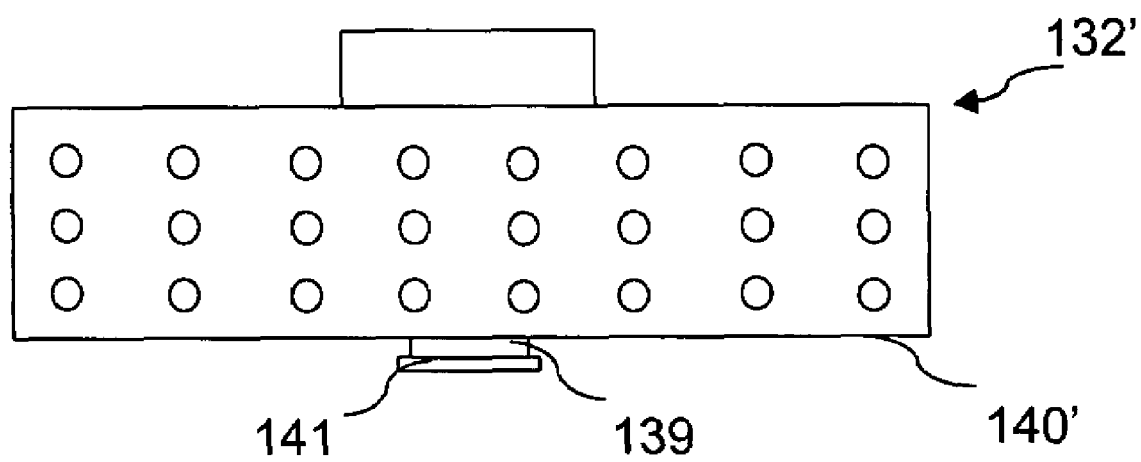
FIG. 7 is a front elevational view to illustrate a structural variation of the upward plate of the outer square wall, wherein at least one post projecting downwardly is positioned on the bottom side of each upward plate.

Referring to FIG. 7, there is illustrated upward plate 132' having structural variations, as compared with the structure of the upward plate 132 from the first preferred embodiment 100 of the present invention. At least one post 139 projecting downwardly is placed on the bottom side 140' of each upward plate 132'. The post 139 is used to support the upward plate 132'. Therefore, an outer square wall is also supported, wherein the outer square wall is assembled with four identical upward plate 132'. In addition, a high-temperature rubber member 141 can be placed on the bottom of each post 139 so that the smooth top surface of the cooktop 166 can be protected.

The heat regulating apparatus 100 including the inner circularly arcuate shell 102 and outer square wall 130 is preferably made of durable metals and metal alloys including iron and steel. In addition, appropriate surface treatments including coatings can be applied to the inner and outer surfaces 108 and 106 of the shell 102, which enhance regulation of the heat convection and heat radiation, as well as durability of the apparatus 100. The coatings are included those from chemical and electrochemical treatments and the ceramic coating as well, which have a preferred white or black color. Similarly, the surface treatments also can be applied to the exterior and interior surface 134 and 136 of the outer square wall 130.

Figure 6:
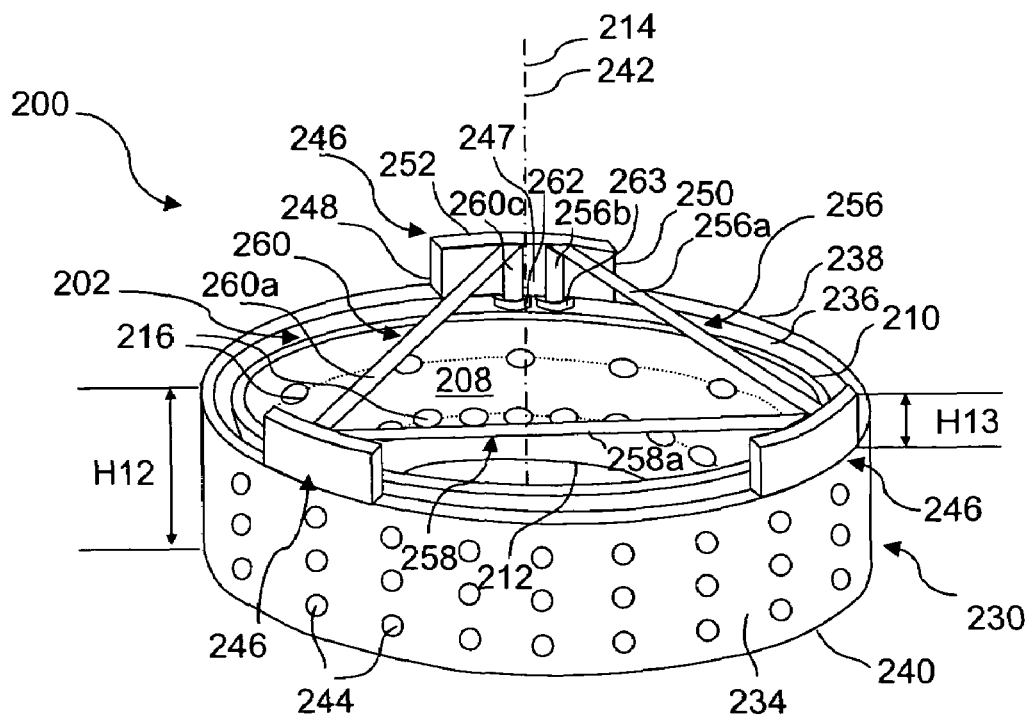
FIG. 6 a perspective view of a removable heat regulating apparatus according to a second embodiment of the present invention.

Referring to FIG. 6, there is illustrated second preferred embodiment 200 of the present invention heat shielding apparatus for the burner of the gas stove, comprising an inner circularly concave hollow shell 202 and an outer circular wall 230.

It will be appreciated that the inner circularly arcuate hollow shell 202 is identical to the inner circularly arcuate shell 102 of the first embodiment 100. Therefore, a disclosure of the structural features of the inner shell 202 will not repeated. These structural features are designated with three-digit numerals, wherein the part numbers are the same with the addition of a "200" to the part numbers to differentiate those same features in the embodiment 200.

As illustrated, the outer circular wall 230 includes a height "H12", an exterior side 234, an interior side 236, a top circumference 238, a bottom circumference 240, and a rotational axis 242 which is aligned with a rotational axis 212 of the inner hollow shell 202. As further illustrated, a plurality of air passages 244 are evenly distributed therethrough the outer wall 230. It will be appreciated that from the spirit and scope of the present invention, a number of the air passages 240 therethrough the outer wall 230 are more than the number of the air passages 216 of the inner circular shell 202.

The circular upward wall 230 is further comprised of at least three identical extensions 246 projecting upwardly from the top side 238, wherein they are circumferentially spaced on the top side. The extension 246 is comprised of a transverse top side 252, and first and second upward sides 248 and 250 having an identical height "H13". However, the height "H13" of the upward sides 248 and 250 is designed to be shorter than the height "H12" of the round wall 230, and the length of the top side 252 is generally longer than the length of the upward sides 248 and 250.

It will be appreciated that the identical extensions 246 of the present invention are designed to have a triple-function. The first one is to support a cookware having a flat bottom side such as the pan, or having a convex shaped bottom side such as the wok. The second on is to provide a gap which is the pathway for the outward and upward heat flow of the flame exhaust gases and air. The third one is to shield an undesirable upward heat flow for preventing a handle of the cookware to be heated. It will be appreciated that at least three extensions 246 are appropriate for supporting the cookware having a flat bottom or a curved bottom.

Referring further to FIG. 6, there is illustration that a first group of an upper hook 262 and a lower hook 264 (not shown) or attachment means are positioned on the interior side 236 of the outer wall 230. The upper hook hooks 262 and lower hook are positioned in parallel with and rightward adjacent a vertical linear position 247, wherein the vertical linear position is aligned with a middle position of the extension 246. In addition, the upper hook 262 is adjacent the top side 238 and the lower hook is adjacent the bottom side 240 of the outer wall 230. Similarly, a second group of an upper hook 263 and a lower hook (not shown) or attachment means are placed on the interior side 236 of the outer wall 230 in parallel with and leftward adjacent the linear position 247. The upper hook 263 is adjacent the top side 238 and the lower hook is adjacent the bottom side 240 of the wall 230.

The attachment means including hooks are designed on the circular wall 230 to affix three identical optional cookware supports 256, 258 and 260, so that a cookware having a small size can be placed on the optional cookware supports for cooking. The first identical optional cookware support 256 is illustrated in FIG. 6 to be in a generally inverted "U" shape, comprising a top transverse section 256a, an identical first downward section 256b and second downward section (not shown).

Referring to FIG. 6 when in use of the first optional supports 256, the first downward section 256b is inserted into the second group of the upper hook 263 and lower hook (not shown) which are leftward adjacent the vertical linear position 247 of the first identical extension 246. The second downward section of the support 256 is inserted into the first group of the upper hook 262 and lower hook (not shown) which are rightward adjacent the line 247 of the second identical extension 246. The second identical extension is in clockwise adjacent the first identical extension. Similarly, the second and third optional supports 258 and 260 can be affixed. Therefore, the top transverse sides 256a, 258a and 260a of the respective first, second and third identical supports 256, 258 and 260 form an equilateral triangle, which is positioned to align with the tranverse top ends 252 of the respective extensions, so that a small sized pan can be conveniently placed onto the top of the triangle for cooking.

It will be appreciated that, from placing the attachment means adjacent the vertical linear position 247 of the outer wall 230, the smallest equilateral triangle can be achieved, so that an even smaller sized cookware can be supported by the top of the smallest equilateral triangular supports. However, from the spirit and scope of the present invention, the attachment means can be placed to any positions on the outer wall 230, so long as the cookware optional supports can be supported by the attachment means. It will be further appreciated that with the presence of the first and second group of the upper and lower attachment means, various variations of the optional supports can be formed. One of them is similar to the configuration of the supports illustrated in FIG. 4B, which will not be repeated again. It will be additionally appreciated that each group of the attachments, is comprised of at least one attachments.

EXAMPLES

The following are examples of the present invention heat regulating apparatus for the burner of the gas stove, which are offered by way of illustration only and not by way of limitation.

(1) Construction of the Heat Regulating Apparatus

A flame heat regulating apparatus was constructed following the illustration which is disclosed for the embodiment 100 of the present invention, comprising an inner circularly concave hollow shell 102 and an outer square wall 130. The inner hollow shell 102 was comprised of a top circumference 110 having a diameter of approximately 19.2 cm, a bottom circumference 112 having a diameter of approximately 7.3 cm, and a height of 3 cm between the top and bottom circumference.

Two groups of air passages 116 were drilled through the circularly concave shell 102 with a diameter of approximately 6 mm for each air passage 116. The air passages 116 in the first group were circumferentially spaced along an upper circumference 118 adjacent the top circumference 110, wherein the upper circumference 118 was 1 cm lower than the top circumference 110, and two adjacent passages 116 were separated with approximately 3 cm. The air passages 116 in the second group were circumferentially spaced along a lower circumference 120, wherein the lower circumference 120 was positioned approximately 0.7 cm higher that the bottom circumference 112 which is positioned. In second group, two adjacent air passages were separated with approximately 1.5 cm.

The outer square wall 130 was constructed as illustrated in FIG. 4, comprising four identical upward plates 132 which were connected to one another. Each upward plate 132 had a length of 21 cm and a height "H2" of 4.2 cm. An extension 146 had a top side 152 of 4 cm and an identical first and second upward side 148 and 150 with a height "H3" of 1.8 cm. The extension 146 was positioned upwardly at the center of a top transverse side 138 of each upward plate 132. Therefore, the maximum height of the upward plate 132 was 6 cm.

A plurality of air passages 144 having a diameter approximately 5 mm are evenly distributed therethrough each identical plate 132. The air passages 144 were constructed, which form a matrix pattern having twelve columns and three rows on each identical upward plate 132. In addition, attachments 162, 164, 163 and 165 were constructed according to the illustration of FIG. 4. Two identical optional supports 154 and 156, which were made with round iron rods for supporting a small sized cookware, was affixed to the square wall 130.

(2) Installation of the Flame Heat Regulating Apparatus onto the Gas Stove Cooktop A gas stove cooktop having the recessed surface, which was similar to the cooktop illustrated in FIG. 2, was used for the experiments. The cooktop contained four gas burners with the sealed gas burner assemblies and two extended removable grates. For each gas burner on the recessed surface, there is an upward round plateau as a part of the recessed surface of the cooktop, wherein a burner neck was positioned at the center of the round plateau which has an approximately diameter of 12 cm and a height of 1 cm. The two extended grates were extended from the front to the back of the cooktop. Each of which was placed over a front gas burner and a back gas burner to support two utensils. The height was 6 cm from the top of the grate to the recessed surface of the cooktop, which was equal to the maximum height of each identical upward plate 132 of the square wall 130.

After removing the right side extended gate, the inner circularly concave shell 102 at its bottom circumference 112 was positioned onto the round plateau to surround a right front gas burner 178. The outer square wall 130 was then positioned on the recessed surface of the cooktop 166 to surround the inner shell 102, wherein the installation was exactly followed by the illustration in FIG. 5. The height of the burner head 180 was 1 cm above the round plateau, which was lower than the height 3 cm of the top circumference 110 of the inner shell 102 relative to the round plateau. In addition, the top circumference 110 of the inner shell 102, which had the height 4 cm relative to the recessed surface of the cooktop 166, was positioned lower than the top square transverse side 138 of the square wall 130, which has the height 4.2 cm.

(3) Experimental Conditions a. References and Tested samples: times needed to boil an amount of water were served as References from using the commercial cooktop to heat the water, wherein the commercial cooktop is illustrated in above section (2). The water was retained inside of a cookware which was placed on the top of the extended grate of the commercial cooktop. Times needed to boil the same amount of water from the setting which is illustrated in FIG. 5 of the present invention were served as the Tested samples, wherein the water was retained inside of the same cookware. The Tested samples were compared with the References from which to judge if the present invention achieved the scope of increased heating efficiency in cooking.

b. Combustive gas flow rates: The right-front burner on the cooktop was chosen for the experiments. A minimum gas flow rate was used to produce a weak flame, according to a mark "LO" of the commercial cooktop. The mark "LO" is an indication of the maximum turning angle of a gas control knob of the commercial gas stove. The weak flame was kept to burn when the experiments were idle. Using this procedure, the gas burner including the surrounding area of the cooktop was kept to be the same temperature before testing the References and Tested samples. In testing, a medium turning angle of the gas flow rate control knob was used, according to a mark "5". An additional arrow was drawn on the knob for precisely aligning with the mark "5" on the cooktop. Therefore, a consistent turned angle was used in the experiments, which results in the same gas flow rate for generating the flame to obtain the References and Tested samples. In addition, the experiments was taken placed after 10 p.m. of the night in the same day so that variation of the gas supplied pressure was kept the minimum.

c. Testing medium: the tap water was used as the testing medium. The water which was collected into a first, second and third large containers was stored in a storage room at least 24 hours before the experiment. The purpose of the water storage is for equalizing the temperature of the water in three containers, when the water was initially collected from the tap water. The temperature of the water in the three containers was measured multiple times during the entire experiments before the water was used.

The tap water was collected into three big containers for the following purposes. The water in the first big container was for first equalizing the temperature of an empty cookware which was used as the water container in the experiments. In a process to equalize the temperature of the cookware, the empty cookware was first rinsed by the running tap water, and second was submerged into the water of the first container for a while. After that, the water inside of the cookware was completely poured out, which was poured back to the first container for a reuse purpose in the entire experiments. The water in the second big container was for second equalizing the temperature of the empty cookware. After twice of equalizing the temperature, the cookware was used for collecting the water which was retained in the third extra large container. The water inside of the cookware was going to be heated in the experiment.

d. Cookware: two kinds of the cookware were used in the tests. The first kind of the cookware was a standard stainless steel round tea kettle with a steam whistle at the top of a mouth of the kettle. The kettle was used as a small sized cookware. In testing, the kettle was placed on the top of the optional cookware supports as illustrated in FIG. 3. When measuring an amount of the collected water, the kettle filled up with the water was first placed on a horizontal surface, and then the amount of the water inside of the kettle was adjusted from adding in or pulling out according to a top water level which reached the mark of a joint line where the mouth was joined to the body of the kettle. The second cookware was a big sized aluminum pot with a glass top cover, which was used as a large sized cookware. When in use of the pot, the equal amount of water was first measured from using the small round kettle. Then the inside water was completely poured into the big pot.

e. Order of the testing: First test: the amount of water in the small round kettle was heated where the round kettle was placed on the flame heat regulating apparatus having the optional cookware supports from the present invention. Second test: the same amount of water in the same small round kettle was heated wherein the kettle was placed on the expended grate of the commercial gas stove cooktop, which is illustrated in section (2). Third test, the same amount of water which was placed in the big pot was heated while using the commercial cooktop setting. Fourth test: the same amount of water in the same big pot was heated when the big pot was placed on the flame heat regulating apparatus from the present invention.

f. Times determined for boiling the water: when using the small round kettle, the times for boiling the water were determined according to an early moment that the steam whistle sounded loudly. When in use of the big pot, the times were determined that a loud sound of the boiling water was recognized.

(4) Testing Results:

TABLE 1

Testing results for the Tested Samples (Sample) and References (Ref.)

| Test | Test Subject | Cookware | Times (min.) | Difference to Ref. | % to Ref. | Efficiency % |
|---|---|---|---|---|---|---|
| 1 | Sample | Kettle | 19.75 | −4.50 (min.) | 81.44% | +18.56% |
| 2 | Ref. | Kettle | 24.25 | | | |
| 3 | Ref. | Big Pot | 24.67 | | | |
| 4 | Sample | Big Pot | 21.08 | −3.59 (min.) | 85.44% | +14.56% |

Table 1 lists the testing results of each category which is illustrated above. The results demonstrate that at least more than 14.5% of the increased heating efficiency in cooking was achieved with applying both small and large sized cookware, as compared with the times needed for the commercial cooktop to boil the same amount of the water. The results of the increased heating efficiency demonstrate importance of regulating the flame heat radiation and flame conviction including the air convection for saving energy in cooking. Therefore, the teaching from the test results is consistent with the spirit and scope of the present invention. In addition, the testing results also demonstrate that application of the present invention removal flame heat regulating apparatus significantly reduces the combustive gas consumption and green house gas production in cooking.

In the above disclosures of the present invention, the first and second embodiments 100 and 200 of the flame heat regulating apparatus are illustrated for the gas stove cooktop having the sealed burner mounting assembly. However, it will be appreciated that the present invention is also appropriate for the gas stove cooktop having the opened burner mounting assembly. In addition, from the spirit and scope of the present invention, the outer wall 130 or 230 can be an extended one, which extends to surround two side-by-side gas burners of the stove cooktop.

It will be further appreciated that, from the spirit of scope of the present invention, the inner hollow shell 102 or 202 and the respective outer wall 130 or 230 can be an integrated one.

It will be further appreciated that, from the spirit of scope of the present invention, the inner hollow shell 102 or 202 and the respective outer wall 103 or 230 can be an integrated one.

In the configuration for the integrated inner hollow shell 102 and outer square wall 130, the top circumference 110 of the inner hollow shell is simultaneously affixed to each of four upward wall 132 of the outer square wall. The affixation takes place at a position 137 on the interior surface 136 of each upward wall 132, as illustrated in FIG. 4. The position 137 is aligned with the middle of the upward wall 132 and a position which is slightly below than the top side 138 of the upward wall. Therefore, the rotational axis 114 of the inner hollow shell and the symmetric axis 142 of the outer square wall are aligned with together. It will be appreciated that after affixation, both the inner hollow shell 102 and the outer square wall 130 in the integrated form can be stood on the cooktop.

For the integrated inner hollow shell 202 and the outer circular wall 230 from the second embodiment, the top circumference 210 of the inner hollow shell 202 is affixed to an upper circumference of the outer wall 230. The upper circumference is positioned on the interior surface 236 of the outer wall 230 in parallel with, but slightly below than the top circumference 238 of the outer wall 230. Therefore, the rotational axis 214 of the inner hollow shell 202 and the symmetric axis 242 of the outer wall 230 are aligned with together.

Based on the integrated models which are illustrated above, a further structural variation of the integrated models can be conducted.

One of the structural variations will be that the outer wall 130 or 230 is reduced to be a plurality of identical members, which each member has functions to support the cookware, prevent the undesirable heating of the cookware handle, and provide a pathway for hot gases to flow outwardly and upwardly. Under this principle, for example, the outer square wall 130 or the outer circular wall 230 can be reduced to comprise at least three identical upward strips, which are evenly spaced to affix to the inner circularly arcuate shell. Each strip has a width which is the same as the length of the top side 152 of the extension 146. In addition, each strip has a height which is the same height as the maximum height of the upward plate 132. Therefore, a bottom end of each of at least three strips stands on the cooktop of the gas stove, and a top end supports the cookware and block the undesirable heating of the cookware handle.

Furthermore, it will be appreciated that, the present invention flame heat regulating apparatus is only comprised of the circularly arcuate shell. Under this structural configuration, the shell is positioned on the cooktop to surround a gas burner, and the commercial grate is used to support the cookware.

Defined in detail, the present invention is an accessory for a cooktop of a gas stove, comprising: a) an inner hollow shell being a circularly concave wall having a top circumference and a bottom circumference, said inner hollow shell from said bottom circumference having a smaller size extends upwardly and outwardly to said top circumference having a larger size, a plurality of air passages being therethrough said inner hollow shell, wherein said air passages are more densely distributed on a lower part of said inner hollow shell, as compared with said air passages which are less densely distributed on an upper part of said inner hollow shell; b) an outer square wall, comprising four identical upward plates having an exterior side, an interior side, a top transverse side and a bottom transverse side, wherein said upward plates are connected to one another to form said square wall, a plurality of air passages are evenly distributed through each said plate, an extension projecting upwardly is positioned at said top transverse side of each said plate, comprising a top side, a first and second upward side; c) said both inner hollow shell and outer square wall are positioned onto the cooktop of the gas stove, said inner hollow shell surrounds a gas burner of the stove, said outer square wall surrounds said inner hollow shell and supports a cookware; d) whereby said accessory being a removable flame heat regulating apparatus which is used to increase heating efficiency of flame in cooking, said inner hollow shell regulating flame heat radiation from reflecting outward and downward heat radiation which is initially radiated by the flame away from said cookware back to heat said cookware, and regulating flame heat convection including air convection to flow to heat said cookware, wherein air with a lower temperature after penetrating through said air passages of said outer square wall mainly flows through said air passages more densely distributed through the lower part of said inner hollow shell, and air with a higher temperature and exhaust gases with a higher temperature of the flame which are both surrounded by said inner hollow shell are regulated to flow upwardly to heat said cookware, said outer square wall regulates air flow to said inner hollow shell, blocks heat radiated from said inner hollow shell, and provide a gap which is a pathway for said flame exhaust gases with the higher temperature and said air with the higher temperature flow outwardly and upwardly to heat said cookware; and e) whereby said accessory being a heat shield, wherein said extension of said outer square wall prevents undesirable heating of a handle of the cookware.

Defined broadly, the present invention is an accessory for a cooktop of a gas stove, comprising: a) an inner hollow shell having a top circumference with a larger size and a bottom circumference with a smaller size, a plurality of air passages being through said inner hollow shell, wherein said air passages are more densely distributed onto a lower part of said inner hollow shell, as compared with said air passages which are less densely distributed onto an upper part of said inner hollow shell; b) an outer wall, comprising an exterior side, an interior side, a top side and a bottom side, a plurality of air passages are evenly distributed through said outer wall, a plurality of extensions projecting upwardly are spaced at said top side of said outer wall, each said extension is comprised of a top side, a first and second upward side; c) said both inner hollow shell and outer wall are positioned onto the cooktop of the gas stove, said inner hollow shell surrounds a gas burner, said outer wall surrounds said inner hollow shell and supports a cookware; and d) whereby said accessory being a removable flame heat regulating apparatus which enables to increase heating efficiency of flame in cooking, said inner hollow shell regulating flame heat radiation to maximumly heat said cookware, and regulating flame heat convection including air convection to flow to said cookware wherein air with a lower temperature mainly flows through said air passages more densely distributed therethrough said lower part of said inner hollow shell, wherein said outer wall blocks heat radiated from said inner hollow shell, and provide a gap for flame exhaust gases with the higher temperature and air with the higher temperature flow outwardly and upwardly to heat said cookware; and e) whereby said accessory being a heat shield, wherein said outer wall prevents undesirable heating of a handle of said cookware.

Defined more broadly, the present invention is an accessory for a cooktop of a gas stove having flame and a cookware wherein the flame burns in the presence of air, comprising: a) a member comprising a plurality of air passages being therethrough, wherein said air passages are more densely distributed onto a lower part of said member, as compared with said air passages which are less densely distributed onto an upper part of said member; b) said member is positioned onto the cooktop to surround a burner; c) means for increasing heating efficiency of the flame; d) means for regulating heat radiation from the flame to heat said cookware, wherein outward and downward heat radiation which is initially radiated by said flame away from said cookware is reflected back to heat said cookware; e) means for regulating heat flow including the air flow to heat said cookware, wherein said air flow including air with a lower temperature and air with a higher temperature; f) means for supporting the cookware; and g) means for preventing undesirable heating of a handler of the cookware.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus for a cooktop of a gas stove, comprising:
   a. an inner hollow shell being a circularly concave wall having a top circumference and a bottom circumference, said inner hollow shell from said bottom circumference having a smaller size extends upwardly and outwardly to said top circumference having a larger size, a plurality of openings serving as air passages penetrate through lower and upper parts of said inner hollow shell, wherein said air passages are more densely distributed onto a lower part of said inner hollow shell, as compared with said air passages which are less densely distributed onto said upper part of said inner hollow shell;
   b. an outer square wall comprising four identical upward plates, each upward plate having an exterior side, an interior side, a top transverse side and a bottom transverse side, said upward plates are connected to one another to form said square wall, a plurality of openings served as air passages are evenly distributed to penetrate through said each upward plate, an extension projecting upwardly is positioned at said top transverse side of said each upward plate, said extension comprising a top side and first and second upward sides;
   c. said both inner hollow shell and outer square wall are positioned onto the cooktop of the gas stove, said inner hollow shell surrounds an upper section of a gas burner of the stove, wherein said upper section includes a plurality of gas ports, said outer square wall surrounds said inner hollow shell and supports a cookware; and
   d. whereby said apparatus increases heating efficiency of flame in cooking, and said extension projecting upwardly is served as a heat shield to prevent heating of a handle of the cookware.

2. The apparatus in accordance with claim 1, wherein said inner hollow shell and said outer square wall are integrated together.

3. The apparatus in accordance with claim 1, wherein said inner hollow shell and said outer square wall are both made with durable metals, or durable metal alloys.

4. The apparatus in accordance with claim 3, wherein said inner hollow shell and said outer square wall are both treated with surface coatings, said surface coatings include chemical coating, ceramic coating and electrochemical coating.

5. The apparatus in accordance with claim 4, wherein said coating is in the preferred color white or black.

6. The apparatus in accordance with claim 1, further comprising a plurality of attachment means on said each upward plate of said outer square wall.

7. The apparatus in accordance with claim 6, further comprising at least two optional cookware supports, which are removably affixed to said attachment means of said outer square wall having said four upward plates, said at least two optional cookware supports are used to additionally support a small cookware.

8. The apparatus in accordance with claim 7, wherein said bottom side of said each upward plate is comprised of at least one support projecting downwardly, which contacts said cooktop to support said outer square wall.

9. The apparatus in accordance with claim 8, further comprising a rubber member which is attached to a bottom of said at least one support projecting downwardly, wherein said rubber member contacts said cooktop to support said outer square wall.

10. The apparatus in accordance with claim 9, wherein said outer square wall is an extended one, which is extended to surround two upper sections of the respective side-by-side placed two gas burners of said stove.

11. The apparatus in accordance with claim 1, wherein said apparatus is for gas stoves having structure of sealed gas burner mounting or opened gas burner mounting.

12. An apparatus for a cooktop of a gas stove, comprising:
 a. an inner hollow shell having a larger top opening with a larger sized circumference or periphery and a smaller bottom opening with a smaller sized circumference or periphery, a plurality of openings serving as air passages penetrate through lower and upper parts of said inner hollow shell, wherein said air passages are more densely distributed onto said lower part of said inner hollow shell, as compared with said air passages which are less densely distributed onto said upper part of said inner hollow shell;
 b. an outer wall comprising an exterior side, an interior side, a top side and a bottom side, a plurality of openings served as air passages are evenly distributed to penetrate through said outer wall, a plurality of extensions projecting upwardly are spaced at said top side of said outer wall, each of said extensions is comprised of a top side and first and second upward sides;
 c. said inner hollow shell is positioned to surround an upper section of a gas burner of the gas stove, wherein said upper section includes a plurality of gas ports, said outer wall is positioned onto the cooktop to surround said inner hollow shell and support a cookware; and
 d. whereby said apparatus increases heating efficiency of flame in cooking, and said each of said extensions projecting upwardly is served as a heat shield to prevent heating of a handle of the cookware.

13. The apparatus in accordance with claim 12, wherein said both inner hollow shell and said outer wall are integrated together.

14. The apparatus in accordance with claim 12, wherein said both inner hollow shell and said outer wall are symmetrical in shape.

15. The apparatus in accordance with claim 12, wherein said inner hollow shell and said outer wall are both treated with surface coatings, said coatings include ceramic coating, chemical coating and electrochemical coating.

16. The apparatus in accordance with claim 15, wherein said coating is in the preferred color white or black.

17. The apparatus in accordance with claim 12, further comprising a plurality of attachment means on said outer wall.

18. The apparatus in accordance with claim 17, further comprising at least two optional cookware supports, which are removably affixed to said attachment means of said outer wall, said at least two optional cookware supports are used to additionally support a small cookware.

19. The apparatus in accordance with claim 17, further comprising that said bottom side of said outer wall is comprised of a plurality of supports projecting downwardly, wherein each of said supports projecting downwardly contacts said cooktop to support said outer wall.

20. The apparatus in accordance with claim 19, further comprising a rubber member which is attached to a bottom of said each of said supports projecting downwardly, wherein said rubber member contacts said cooktop to support said outer wall.

21. The apparatus in accordance with claim 20, wherein said outer wall is an extended one, which is extended to surround two upper sections of the respective side-by-side placed two gas burners.

22. The apparatus in accordance with claim 12, wherein said apparatus is for gas stoves having structure of sealed gas burner mounting or opened gas burner mounting.

23. An apparatus for a cooktop of a gas stove, comprising:
 a. a hollow shell having a larger top opening with a larger sized circumference or periphery and a smaller bottom opening with a smaller sized circumference or periphery, a plurality of openings serving as air passages penetrate through lower and upper parts of said inner hollow shell, wherein said air passages are more densely distributed onto said lower part of said hollow shell, as compared with said air passages which are less densely distributed onto said upper part of said hollow shell;
 b. at least three upward supports;
 c. said hollow shell is positioned to surround an upper section of a burner of said gas stove, wherein said upper section includes a plurality of gas ports, said at least three upward supports are positioned onto said cooktop to surround said hollow shell and support a cookware; and
 d. whereby said apparatus increases heating efficiency of flame in cooking, and one of said at least three upward supports is additionally served as a heat shield to prevent heating of a handle of said cookware.

24. The apparatus in accordance with claim 23, wherein said both hollow shell and said at least three upward supports are integrated together, and said hollow shell is symmetrical in shape.

25. The apparatus in accordance with claim 23, further comprising a rubber member which is attached to a bottom of each of said at least three upward supports, wherein said rubber member contacts said cooktop.

26. The apparatus in accordance with claim 23, wherein said apparatus is for gas stoves having structure of sealed gas burner mounting or opened gas burner mounting.

27. An apparatus for a cooktop of a gas stove, comprising:
 a. a hollow shell having a larger top opening with a larger sized circumference or periphery and a smaller bottom opening with a smaller sized circumference or periphery, a plurality of openings served as air passages penetrate through lower and upper parts of said hollow shell, wherein said air passages are more densely distributed onto said lower part of said hollow shell, as compared with said air passages which are less densely distributed onto said upper part of said hollow shell, said hollow shell is positioned to surround an upper section of a burner of said gas stove, wherein said upper section of the burner includes a plurality of gas ports;
 b. means, applied by upward structure, surrounding said hollow shell, for supporting a cookware, and preventing heating of a handle of said cookware; and
 c. whereby said apparatus focuses heat on cookware.

* * * * *